(12) United States Patent
Howe et al.

(10) Patent No.: US 11,020,935 B2
(45) Date of Patent: Jun. 1, 2021

(54) THERMOPLASTIC CELLULAR NETWORK TOUGHENED COMPOSITES

(71) Applicant: The Boeing Company, Chicago, IL (US)

(72) Inventors: Christopher A. Howe, Albert Park (AU); Kariza Thea Martin, Melbourne (AU); Michelle Louise Gee, Bundoora (AU); Adrian Mouritz, Melbourne (AU)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/739,458

(22) Filed: Jan. 10, 2020

(65) Prior Publication Data

US 2020/0147925 A1 May 14, 2020

Related U.S. Application Data

(63) Continuation of application No. 15/957,071, filed on Apr. 19, 2018, now Pat. No. 10,562,262.

(51) Int. Cl.
| | |
|---|---|
| *B32B 5/14* | (2006.01) |
| *B29C 70/02* | (2006.01) |
| *B32B 5/02* | (2006.01) |
| *B32B 27/12* | (2006.01) |

(Continued)

(52) U.S. Cl.
CPC ............. *B32B 5/14* (2013.01); *B29C 70/021* (2013.01); *B29C 70/026* (2013.01); *B32B 5/02* (2013.01); *B32B 27/12* (2013.01); *B29C 64/118* (2017.08); *B29K 2101/12* (2013.01); *B29K 2995/0089* (2013.01); *B32B 2307/558* (2013.01)

(58) Field of Classification Search
CPC .. B32B 5/14; B32B 5/02; B32B 27/12; B32B 2307/558; B29C 70/021; B29C 70/026; B29C 64/118; B29K 2101/12; B29K 2995/0089
USPC .......................................................... 428/114
See application file for complete search history.

(56) References Cited

U.S. PATENT DOCUMENTS

| | | |
|---|---|---|
| 4,001,366 A | 1/1977 | Brumlik |
| 7,981,495 B2 | 7/2011 | Kim et al. |
| 9,845,556 B2 | 12/2017 | Meure et al. |

(Continued)

FOREIGN PATENT DOCUMENTS

| | | |
|---|---|---|
| EP | 3000922 | 3/2016 |
| WO | 2017100783 | 6/2017 |

OTHER PUBLICATIONS

Nguyen, A.T.T., et al., "Hierarchical surface features for improved bonding and fracture toughness of metal-metal and metal-composite bonded joints", International Journal of Adhesion & Adhesives, 2016, pp. 81-92, vol. 66.

Vaidya, U.K., et al., "Affordable Processing and Characterization of Multi-Functional Z-Pin Reinforced VARTM Composites", Proceedings of the 13th International Conference on Composite Materials, 2001, pp. 1-10.

(Continued)

*Primary Examiner* — Brent T O'Hern
(74) *Attorney, Agent, or Firm* — Gates & Cooper LLP

(57) ABSTRACT

A composite article including fiber tows and a network including material drawn or pulled between the fiber tows. The network forms a physical barrier reducing propagation of cracks in the composite article. Exemplary structures described herein are the first to use a novel cellular architecture to toughen resin infused composites and create a continuous through thickness reinforcement that does not induce fiber breakage.

20 Claims, 16 Drawing Sheets

(51) Int. Cl.
B29C 64/118 (2017.01)
B29K 101/12 (2006.01)

(56) References Cited

U.S. PATENT DOCUMENTS

| | | |
|---|---|---|
| 10,081,722 B2 | 9/2018 | Meure et al. |
| 2002/0112325 A1 | 8/2002 | Keohan et al. |
| 2008/0230652 A1* | 9/2008 | Biornstad .......... B29D 99/0014 244/120 |
| 2010/0065367 A1 | 3/2010 | Vermilyea et al. |
| 2012/0156422 A1 | 6/2012 | Kozar et al. |
| 2015/0024203 A1 | 1/2015 | Choi et al. |
| 2016/0031182 A1 | 2/2016 | Quinn et al. |
| 2016/0083871 A1 | 3/2016 | Meure et al. |
| 2016/0114532 A1 | 4/2016 | Schirtzinger et al. |

OTHER PUBLICATIONS

Heimbs, S., et al., "Failure behaviour of composite T-joints with novel metallic arrow-pin reinforcement", Composite Structures, 2014, pp. 16-28, vol. 110.
Extended European Search Report dated Oct. 7, 2019 for European Patent Application No. 19170386.7.
Extended European Search Report dated Oct. 4, 2019 for European Patent Application No. 19167994.3.
Qin, Z., et al., "Structural optimization of 3D-printed synthetic spider webs for high strength", Nature Communications, May 2015, pp. 1-7, vol. 6.
Extended European Search Report dated Sep. 9, 2019 for European Patent Application No. 19170124.2.
PCT International Search Report and Written Opinion dated Oct. 7, 2019 for PCT Application No. PCT/US2019/026542.
Non-Final Office Action dated Apr. 7, 2020 for U.S. Appl. No. 16/364,606.

* cited by examiner

Process flowchart

THERMOPLASTIC CELLULAR NETWORK TOUGHENED COMPOSITES

CROSS REFERENCE TO RELATED APPLICATIONS

This application is a continuation under 35 U.S.C. § 120 of co-pending and commonly-assigned United States Utility patent application Ser. No. 15/957,071 filed on Apr. 19, 2018, now U.S. Pat. No. 10,562,262 issued Feb. 18, 2020, by Christopher A. Howe, Kariza Martin, Michelle Louise Gee, and Adrian Mouritz, and entitled "THERMOPLASTIC CELLULAR NETWORK TOUGHENED COMPOSITES," which application is incorporated by reference herein.

BACKGROUND

1. Field

The present disclosure describes novel composite structures and methods of fabricating the same.

2. Description of the Related Art

Composites are replacing metals as structural materials because of their light weight, relative strength, and their ability to be molded into more complex shapes. However, conventional composite structures can exhibit cracking (in particular delaminations) under stress. Conventional composite toughening techniques in the form of interlayers (such as thermoplastic veils and particles) exhibit limited effectiveness in controlling failure at high stress concentration regions. In many cases, a toughened film adhesive is required to achieve the required through thickness toughness properties. Moreover, mechanical fasteners may be the default for acceptable design. This is particularly a concern for integrated aircraft structures where areas of high stress (100) occur throughout the structure thickness such as at a joint radius (see FIG. 1). Therefore, a crack (102) that develops at the joint radius would only need to jump to an untoughened layer for brittle failure to occur. Such cracking might be mitigated using a through thickness toughening technique. However, conventional through thickness methods (such as film adhesives) are not employed in liquid molded structures due to disruption of the resin flow path during infusion, leading to defects such as voids, porosity and dry spots. Such defects significantly lower in-plane properties of the composite laminate structure.

Examples of through thickness techniques and their constraints are listed below:
- Z-pins: used for stacked reinforcements but are not currently used due to microstructural imperfections that occur during the insertion process.
- Stitches: used for toughening dry fiber preforms but are not currently used due to microstructural imperfections that occur during the insertion process.
- Three dimensional (3D) woven/3D knitted/3D braided preforms that are typically applied with liquid molding methods. However, due to fiber misalignment within the 3D preform caused during the manufacturing processes, these preforms are limited to specific geometries and are not readily applied at integrated aircraft joints.

FIG. 2 shows an Ashby plot characterizing conventional veil, stitch and z-pinned toughened composites and highlights the gap where in plane properties have been measured as Open Hole Compression (OHC) strength versus Mode I Interlaminar Fracture Toughness (Gic). FIG. 2 shows that through thickness methods significantly increase mode I fracture toughness compared to veils and that an increase up to 1400% is possible with z-pins. However, through thickness reinforcements reduce damage tolerance in terms of OHC strength and other in-plane properties due to the microstructural imperfections induced during their manufacturing process. Veils applied as interlayers, on the other hand, show a lower reduction in OHC, where less disruption to the fibers is caused during the application of veil to the fiber preform. However, the effective improvement in Gic is poor. Thus, the gap representing performance that has not been conventionally achieved is obtaining a high mode I fracture toughness without degradation of damage tolerance and in-plane properties using continuous through thickness reinforcements.

What is needed, then, is a through thickness technique that is continuous through the composite and does not reduce in-plane properties. The present invention satisfies this need.

SUMMARY

The present disclosure describes a composite article (300) including a plurality of fiber tows (302) and a network (304) of material (314) combined with the fiber tows (302). The network (304) comprises layers (306a, 306b) connected by pillars (308), wherein each of a plurality of the pillars (308) are drawn from one of the layers (306a) and pass through a different space (310) between the fiber tows (302) so as to connect the one of the layers (306a) to another of the layers (306b). The network (304) forms a physical barrier reducing propagation of cracks in the composite article (300).

The composite article may be embodied in many ways. Examples, include but are not limited to, one or any combination of the following examples.

1. The composite article including a plurality of plies (312), wherein the plurality of plies (312) each include a plurality of the fiber tows (302) and a plurality of the different spaces (310), wherein at least one of the plies (312) is between two of the layers (306a, (306b) connected by the pillars (308), and the plurality of the pillars (308) drawn from the one of the layers (306a) pass through the different spaces (310) in the at least one ply (312) between the two of the layers (306a, 306b).

2. The composite article (300), wherein the pillars (308) and/or the layers (306a, 306b) comprise material (314) used for additive manufacturing.

3. The composite article (300), wherein the layers (306a, 306b) and/or the pillars comprise a thermoplastic or a hybrid of the thermoplastic, 4. The composite article (300), wherein the pillars (308) and/or the layers comprise a thermoplastic comprising polyamide, polyetherketone (PEK), polyetheretherketone (PEEK), polyetherketoneketone (PEKK), polyimide (PI), or polyetherimide (PEI)

5. The composite article (300) wherein the fiber tows (302) comprise at least one material (314) chosen from fiberglass, kevlar, thermoplastic, and carbon.

6. The composite article (300) wherein the pillars (308) and/or the layers comprise a hybrid of a thermoplastic including at least one additive or inclusion selected from a surfactant, a stabilizer, a powder, a fiber, and a particulate.

7. The composite article (300) wherein the fiber tows (302) each have a diameter of at least 2 mm and include at least 1000 fibers, and/or the plies (312) each have a thickness in a range of 2-10 mm, and/or the pillars (308) and the layers (306a, 306b) each have a thickness in a range of 2-5 mm, and/or the pillars (308) each have a length in a range of 1-3 mm, and/or the composite article (300) has a total thickness in a range of 1.0 mm-50-mm.

8. The composite article (300) wherein the plies (312) comprise the fiber tows (302) arranged into a braided fabric, a woven fabric, a non-crimp fabric, or unidirectional tape.

9. The composite article (300) further comprising resin filling gaps between the plies (312) and bonded to pillars (308), the layers (306a, 306b), or the layers (306a, 306b) and the pillars (308).

10. The composite article (300) wherein the layers and/or the pillars (308) have a roughened surface that aids mechanical interlocking with resin.

11. The composite article (300) wherein the pillars (308) are thicker at a base (318) from which the pillar is drawn from the one of the layers (306a).

12. The composite article (300) wherein the pillars (308) are inclined from the one of the layers (306a) to the another of the layers (306b).

13. A joint (1002) comprising the composite article (300).

The present disclosure further describes an integrated aircraft structure (1000), comprising a skin (1004), a stiffener (1006), and an interfacial region (1008) between the skin (1004) and the stiffener (1006), wherein the interfacial region (1008) comprises a composite article (300) including fiber tows (302), and a network (304) comprising material (314) drawn between the fiber tows (302) and forming a physical barrier reducing propagation of cracks in the composite article. The interfacial region (1008) comprising a portion of the skin (1004), a portion of the stiffener (1006), and/or a layer between the skin (1004) and the stiffener (1006).

The present disclosure further describes a method of manufacturing a composite article (300), comprising (a) depositing material (314) from an outlet (450) onto a base layer (408) while moving the outlet (450) and the base layer (408) relative to one another, first in an x-y plane (412) and then in a z-direction (414), so as to form an anchor (316) on the base layer (408); (b) moving the outlet (450) and the base layer (408) relative to one another with no feed of the material (314) from the outlet (450), so that a portion of the anchor (316) is drawn to create a pillar (308); (c) moving the outlet (450) and the base layer (408) relative to one another so that the outlet (450) is positioned above a next location (702) on the base layer (408); (d) repeating steps (a)-(c) so as to create a plurality of the pillars (308) on the base layer (408); (e) providing a ply (312) comprising a plurality of fiber tows (302) so that each of a plurality of the pillars (308) pass through a different space (310) between the fiber tows (302); and (f) coupling a layer (306a) to the pillars (308) so that the pillars (308) pass between the fiber tows (302) before connecting with the layer (306b); and so that a composite article (300) comprising the pillars (308), the layer, and the ply (312) is made.

In one or more examples, the base layer (408) comprises a mat (800) of the material (314) deposited using three dimensional printing. Alternatively, the pillars (308) may be manufactured using three dimensional printing (e.g., fused deposition modeling) and the fiber tows (302) and the layer (306a) may be fabricated using one or more methods different from the three dimensional printing.

The method may further comprise repeating steps (a)-(f) using the layer (306a) as the base layer (408) in the next step (a).

In one or more examples, the ply (312) is placed after the formation of the pillars (308).

In one or more further examples, the ply (312) is placed prior to formation of the pillars (308) so that the portion of each of the anchors (316) is drawn between the fiber tows (302) to create the pillars (308).

In one or more examples, each of a plurality of the pillars (308) are bonded to at least one of the fiber tows (302) as the portion of each of the anchors (316) is drawn between the fiber tows (302). In yet further examples, a post-processing step is performed wherein each of a plurality of the pillars (308) are bonded to at least one of the fiber tows (302) after the fiber tows (302) and pillars (308) have been deposited.

BRIEF DESCRIPTION OF THE DRAWINGS

Referring now to the drawings in which like reference numbers represent corresponding parts throughout.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

I. Example Structures

The current solution for toughening of resin infused manufactured composites is using a thermoplastic veil. Through thickness methods are not typically employed due to manufacturing limitations and/or microstructural defects induced during the manufacturing process.

The toughening method and structures presented herein, on the other hand, form a novel 3D architecture that can be used within a composite to enhance toughness by causing cracks to deflect as they encounter cell walls. In some embodiments, the toughening structures comprise structures found in bio-composites such as wood, bone, horns and hooves.

Figure 1:
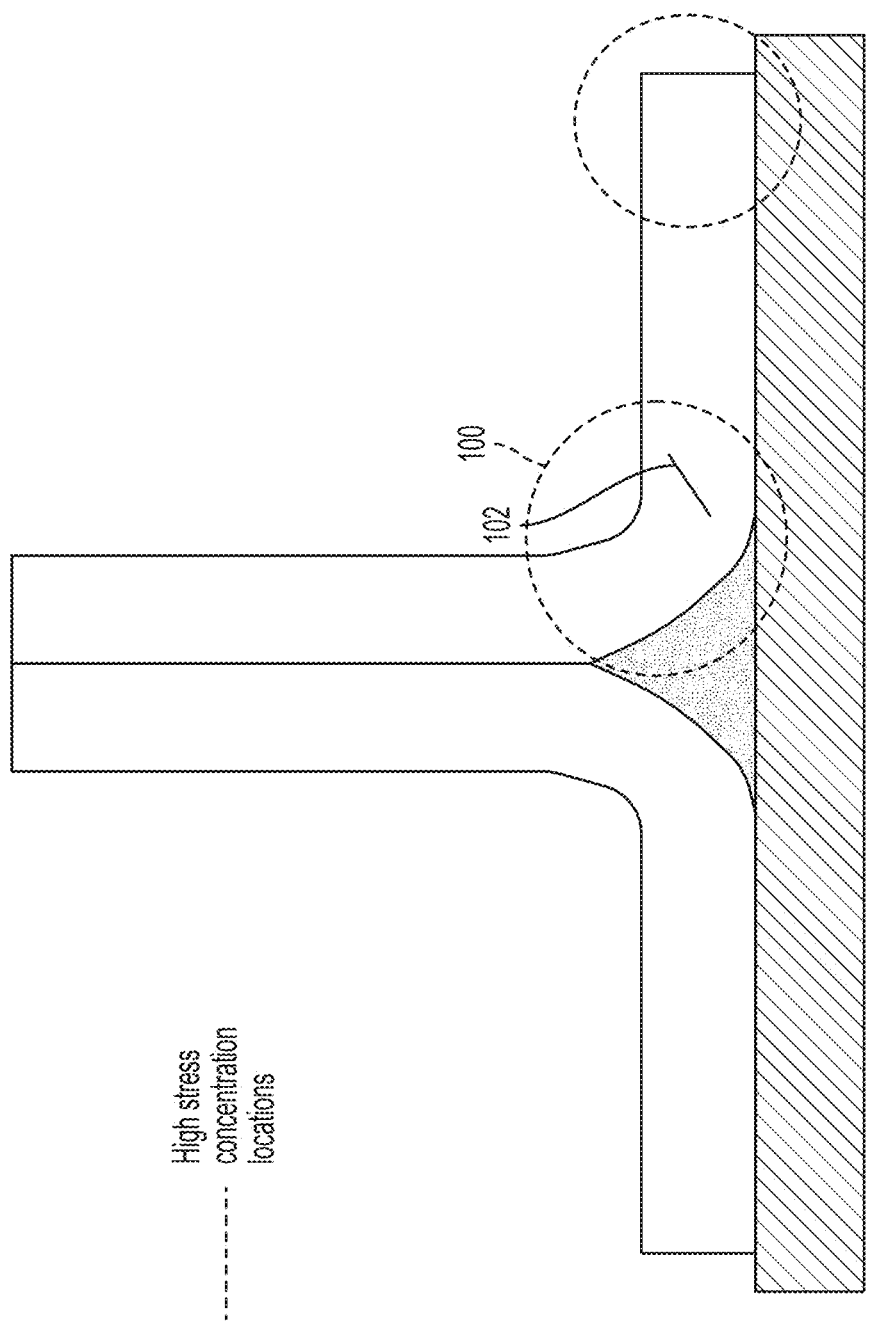
FIG. 1 illustrates high stress concentration regions in a T-Joint.
Figure 2:
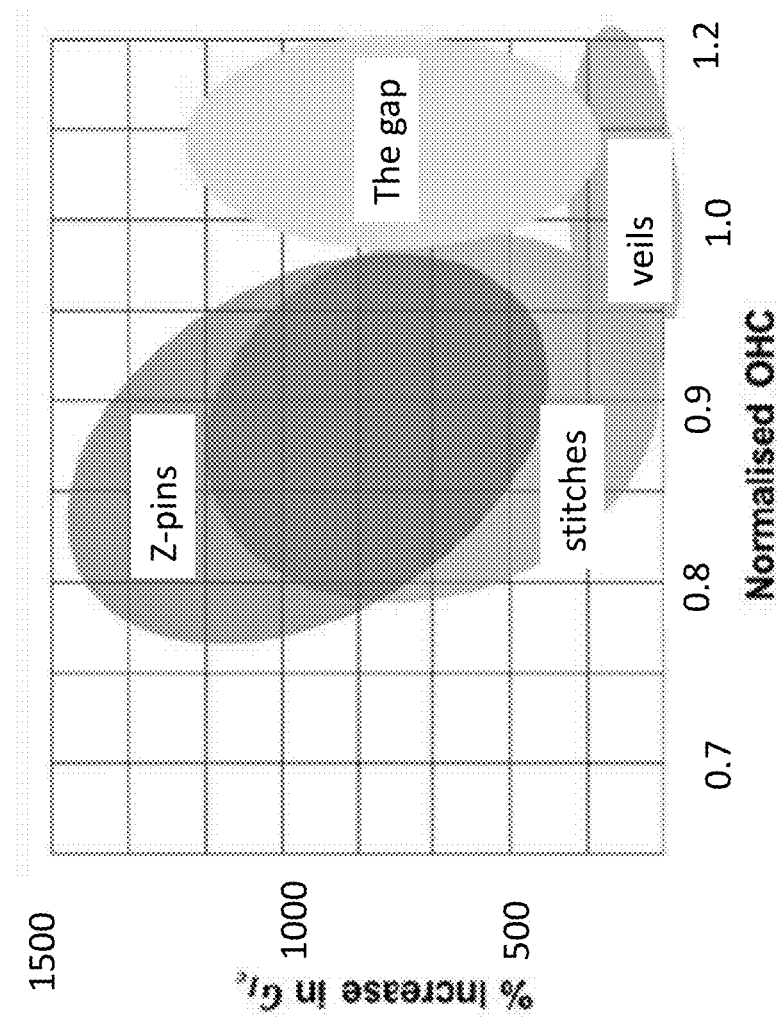
FIG. 2 illustrates the gap representing performance (in terms of achieving fracture toughness and maintaining in-plane properties) that is not achievable in conventional structures.
Figure 3A:
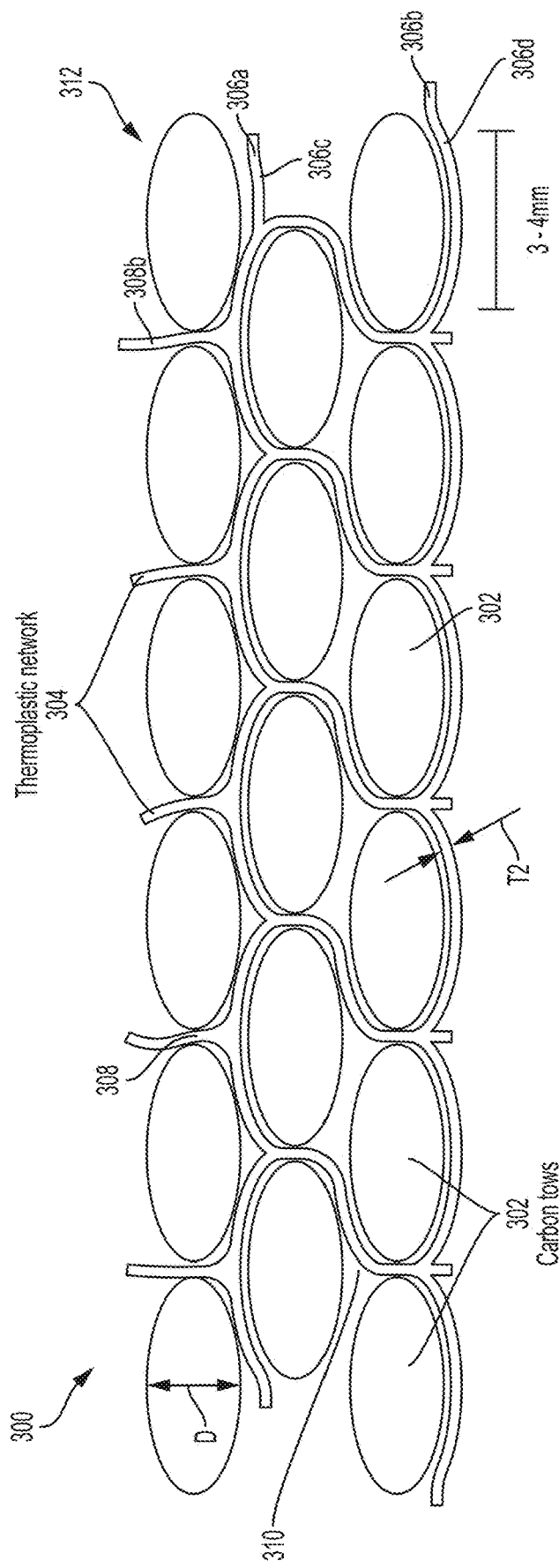
FIG. 3A illustrates a cellular network combined with fiber tows according to one or more embodiments described herein.

FIG. 3A illustrates an example composite article (300) comprising a plurality of the fiber tows (302) intermingled or combined with a network (304) comprising layers (306a, 306b) connected by drawn material (308b) comprising pillars (308). Each of a plurality of the pillars (308) are drawn from one of the layers (306a) and pass through a different space (310) between the fiber tows (302) so as to connect the one of the layers (306a) to another of the layers (306b).

The drawn material (308b) is not limited to pillars (308). In other embodiments, also illustrated in FIG. 3A, the drawn material (308b) comprises a wall (308c) having an appropriate shape and geometry so as to be drawn from one of the layers (306a) and pass through each of a plurality of different spaces (310) between the fiber tows (302) and connect the one of the layers (306a) to another of the layers (306b). In one or more examples, layers (306a, 306b) may also comprise or form walls (306c, 306d).

The network (304) comprising the drawn material (308b) and layers (306a, 306b) forms a physical barrier reducing propagation of cracks (interlaminar, intralaminar, and/or translaminar cracks) in the composite article (300). In various examples, the drawn material (308b) is inclined between the layers (306a, 306b) so as to form a non-uniform geometry that increases the surface area of the drawn material (308b) and creates a more tortuous pathway for the cracks.

In one or more examples, the fiber tows (302) separated by spaces (310) are disposed in a plurality of plies (312). Each of the plies (312) are between two of the layers (306a, 306b) connected by the pillars (308) or walls (308c) so that the plurality of the pillars (308) or walls (308c) drawn from one of the layers (306a) pass through the different spaces (310) in the ply (312) between two of the layers (306a, 306b).

In typical embodiments, the drawn material (308d) and layers (306a, and 306b) of the network (304) are cell walls created using a 3D printer; however the process is not 3D printing in the traditional sense as the pillars (308) or walls (308c) are not created layer by layer. The 3D printer is instead used as a tool to deposit controlled amounts of material (314) onto a fibrous portion (the plies (312)) in the x-y plane and then the tool uses the plasticity of the material (314) to pull the material (314) in a vertical direction.

Figure 3B:
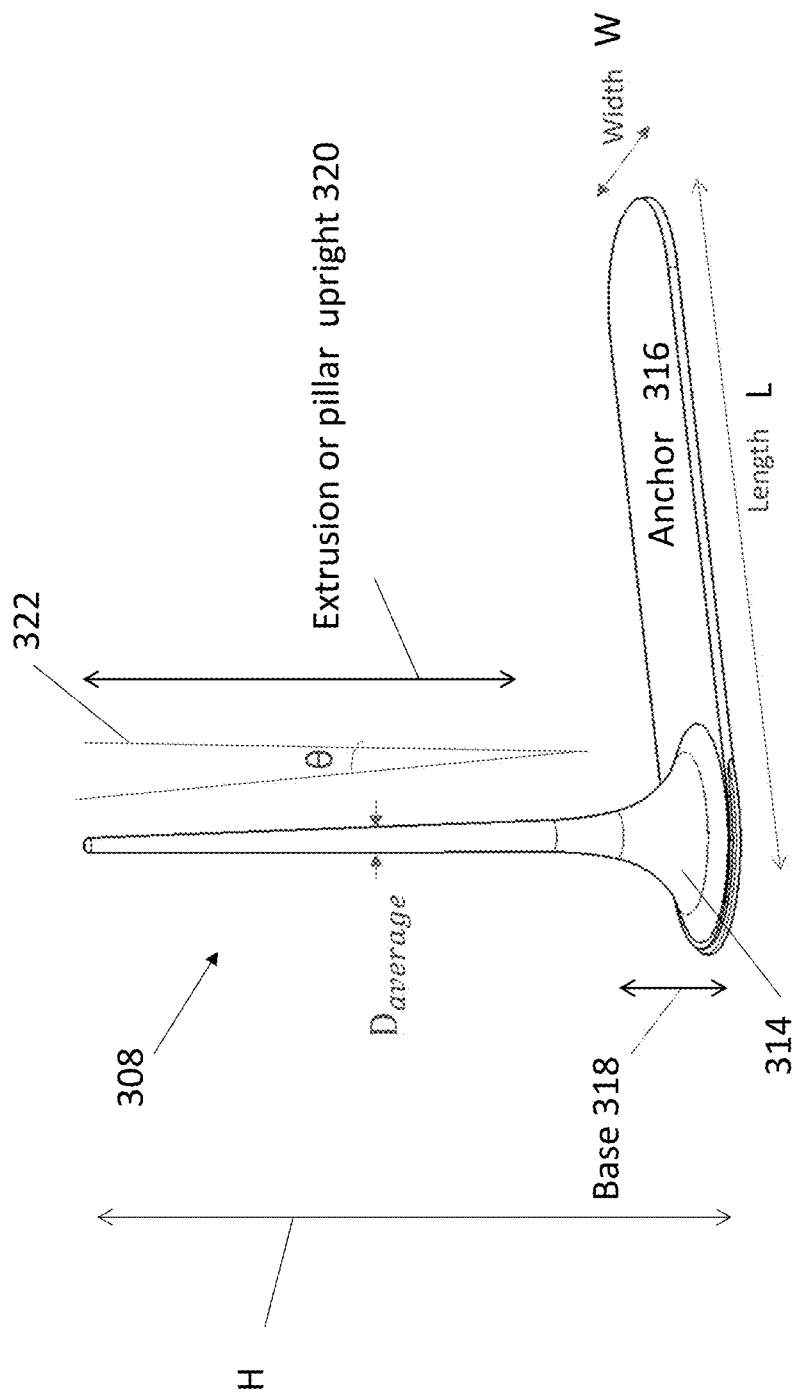
FIG. 3B illustrates material deposited in the cellular network includes an anchor, a pillar or extrusion, and a pillar base or extrusion base.

FIG. 3B illustrates an example wherein the tool uses the plasticity of the material (314) to pull the material (314) in a vertical direction to form thin upright strands or pillars (308). Thus, the deposited material (314) is drawn from an anchor (316) and forms a pillar (308) including a base (318) (e.g., extrusion base) and an upright (320) (e.g., extrusion), the upright (320) having an average diameter Daverage along the upright (320) or extrusion and an angle $\theta$ with respect to a vertical direction (322). In one example, material (314) is also fed or deposited during the pulling to form the pillar (308). The process conditions during deposition or pulling of the material (314) may be controlled to obtain various shapes for the pillar (308). In one or more examples, the base (318) on the anchor (316) is thicker than the upright (320) portion of the pillar (308).

Figure 3D:
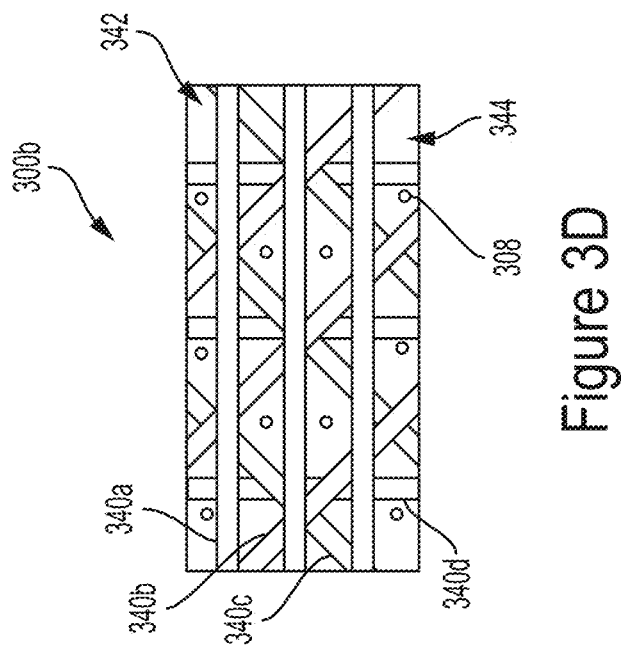
FIG. 3D is a top view of FIG. 3C.
Figure 3C:
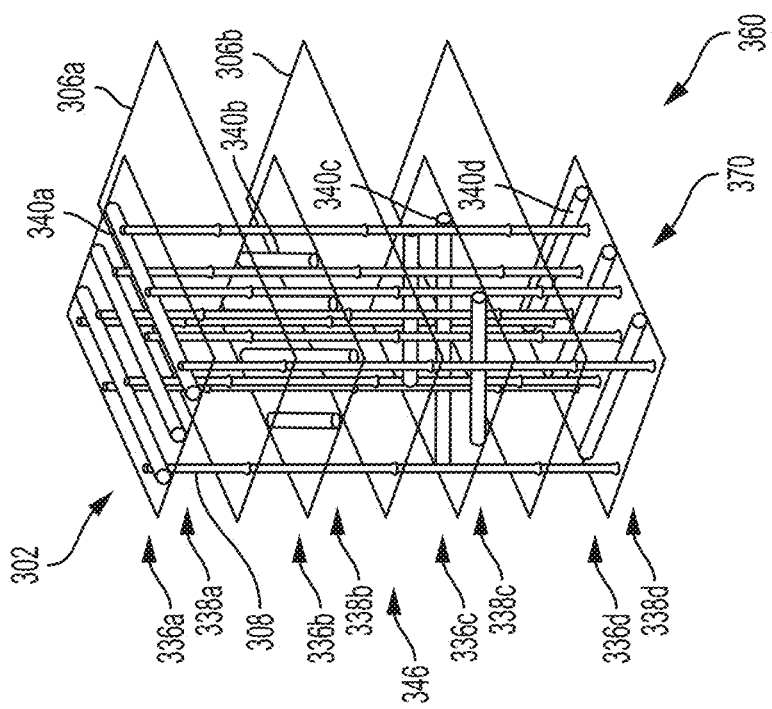
FIG. 3C illustrates an embodiment wherein spaces are defined by fiber tows in different layers.

FIGS. 3C and 3D illustrate examples wherein the plies (312) in the composite article (300e) include a plurality or a stack (360) of plies (336a, 336b, 336c, 336d) or layers (338a, 338b, 338c, 338d) each having different orientations (370) of (e.g., unidirectional) fiber tows (340a, 340b, 340c, 340d). In this case, spaces (342) or pores (344) are created through a plurality of the layers (338a, 338b, 338c, 338d) or plies (336a, 336b, 336c, 336d) and the spaces (342) or pores (344) are bounded, defined, or walled by the fiber tows (340a, 340b, 340c, 340d) in different plies (336a, 336b, 336c, 336d) or different layers (338a, 338b, 338c, 338d).

The plies (336a, 336b, 336c, 336d) that lie in different planes (346) comprise fiber tows (340a, 340b, 340c, 340d) aligned or oriented at different angles with respect to each other so as to define the pores (344) or spaces (342). In one example wherein the plies (312) comprise mats (600) (e.g., as illustrated in FIG. 6B), the fiber tows (302) in each pair of adjacent plies (312) are at 90 degrees to one another and are woven together. However, in other examples, the fiber tows (340a, 340b, 340c, 340d) can be oriented at any angle (e.g., 45 degrees) with respect to each other. In one or more examples, the height H of the pillar (308) or wall (308c) is a function of how many layers (338a, 338b, 338c, 338d) or plies (336a, 336b, 336c, 336d) define the walls of the pores (344) or spaces (342). In one or more examples, the spaces (342) between the fiber tows (340a, 340b, 340c, 340d) are in an intermediate layer (338b) between the fiber tows (340a, 340c).

Figure 3E:
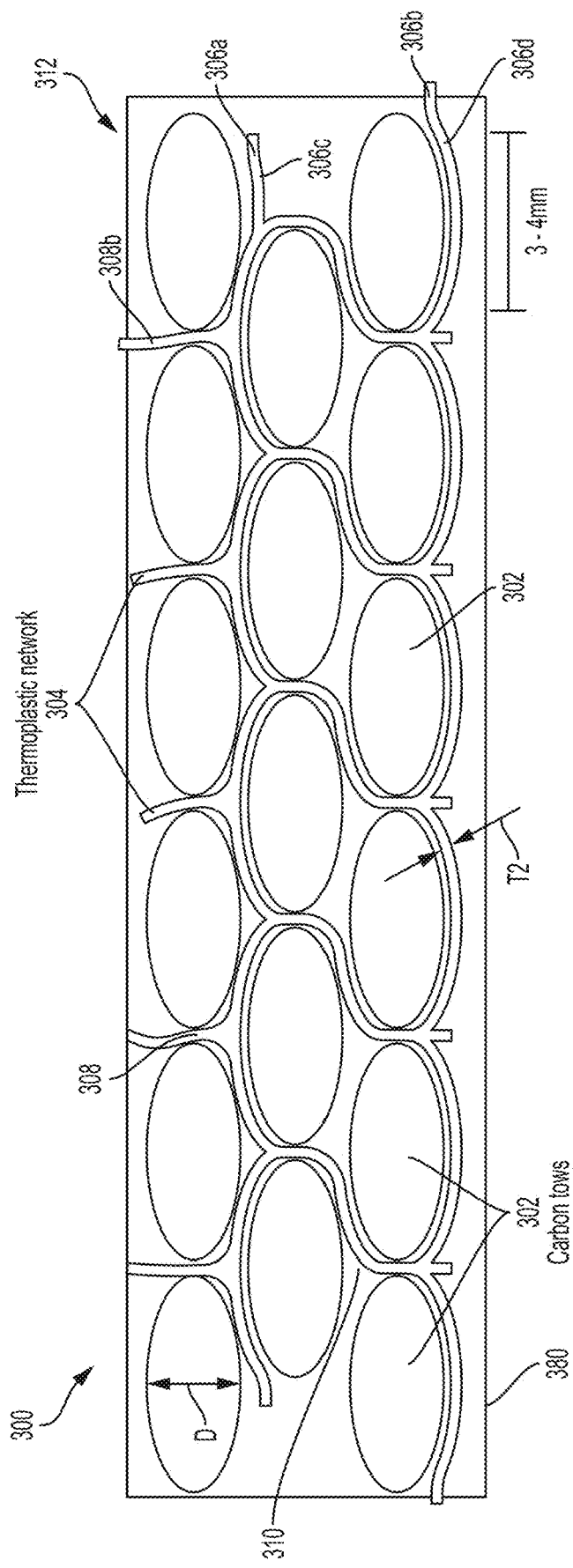
FIG. 3E illustrates an embodiment wherein a resin is combined with the composite.

FIG. 3E illustrates a composite article (300f) including a resin (380) combined with the plies (312) and the drawn material (308b).

Examples of the material (314) used to fabricate the drawn material (308b) and the layers (306a, 306b) include, but are not limited to, a material used in additive manufacturing (e.g., a polymer). The polymer may comprise a thermoplastic, such as polyamide, polyetherketone (PEK), polyether ether ketone (PEEK), polyetherketoneketone (PEKK), polyimide (PI), polyetherimide (PEI) polyphenylsulphone, or hybrid forms of the aforementioned thermoplastics with modifiers and/or inclusions such as a carbon nanotube, graphene, a clay modifier, discontinuous fibers, surfactants, stabilizers, powders and particulates.

In exemplary embodiments, the fiber tows (302) comprise bundles of fibers. In various examples the fibers comprise at least one material chosen from fiberglass, kevlar, carbon, and thermoplastic.

In one or more examples, the fiber tows are woven (302) or arranged into a braided fabric, a woven fabric, or a non-crimp fabric, or fibrous portion. In other embodiments, the fiber tows (302) are arranged in unidirectional tape with slits or gaps (comprising parallel tows with gaps there between), braids, or multi-axial reinforcements.

In one or more examples, pillars (308) link between intermediate layers (306a and 306b), to form a connected network around a distribution of fiber tows (302). The fiber tows may comprise of fibers or filaments, arranged in a reinforcement form, including braids, wovens, non-crimp fabrics and unidirectional forms. The filaments may be composed primarily of carbon, glass, and/or aramid. Other filaments, in combination with the aforementioned, may also include polyamide, polyetherimide, polyetherketone, polyetheretherketone, polyetherketoneketone, polyimide, phenoxy and polyphenylsulphone. Multiple layers of reinforcement may be formed with braids, wovens, non-crimp fabrics and unidirectional formats. The location of the pillars (308) within the pore space between fiber tows within these multiple layers of reinforcement connected to the interlayers creates the (e.g., thermoplastic) network (in x, y, and z directions).

II. Example Manufacturing Methods a. Network Formation

Figure 4:
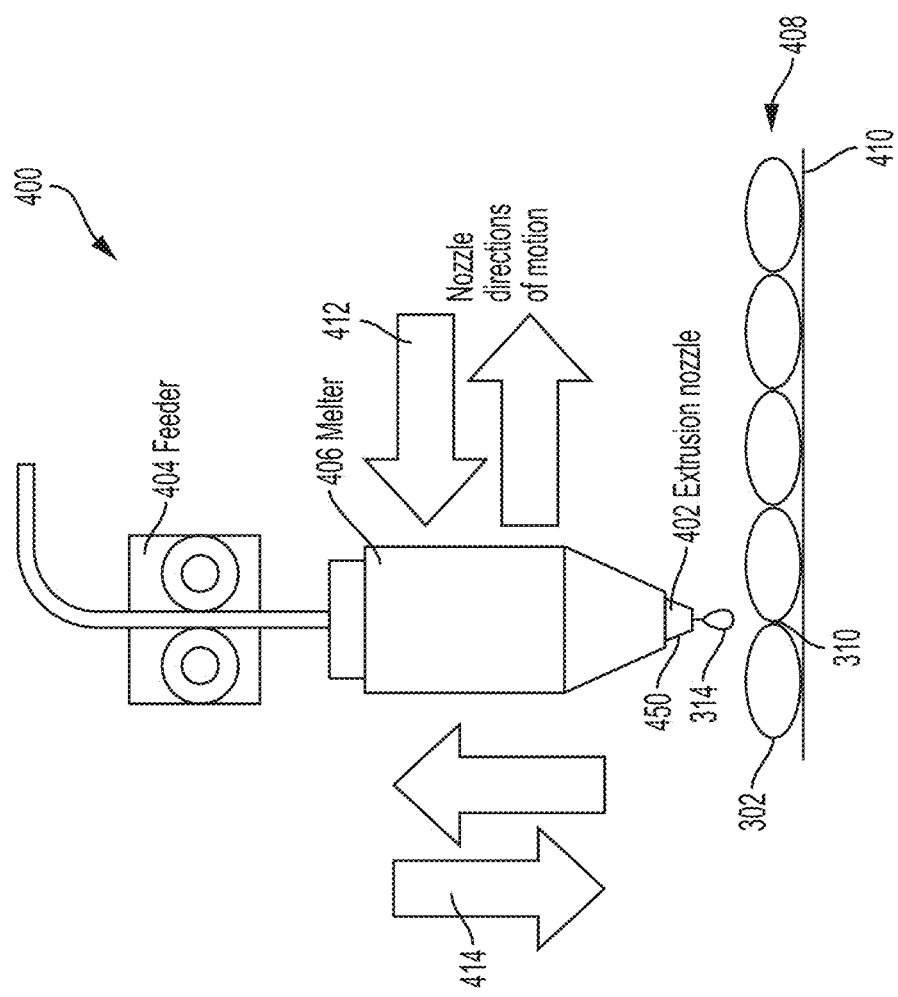
FIG. 4 illustrates an exemplary three dimensional (3D) printer that can be used to manufacture the composite articles described herein.

FIG. 4 illustrates an exemplary 3D printer 400 comprising an extrusion nozzle (402), a feeder (404), and a melter (406) for feeding material (314) onto a ply (312) or base layer (408) and into pores or spaces (310) between the fiber tows (302) in the ply (312), and a platform (410) (e.g., print bed or base) for supporting the plies (312) or base layer (408) while the material (314) is combined with the plies (312). Example printers 400 include, but are not limited to, a desktop Fused Deposition Modeling (FDM) 3D printer. In one or more examples, the 3D printer is controlled by software executing a computer program. The platform (410) and/or the nozzle (402) are moved so that the nozzle (402) and the plies (312) or base layer (408) can be moved relative to one another in an x-y plane (412) and vertically up or down in a z-direction (414).

Figure 5:
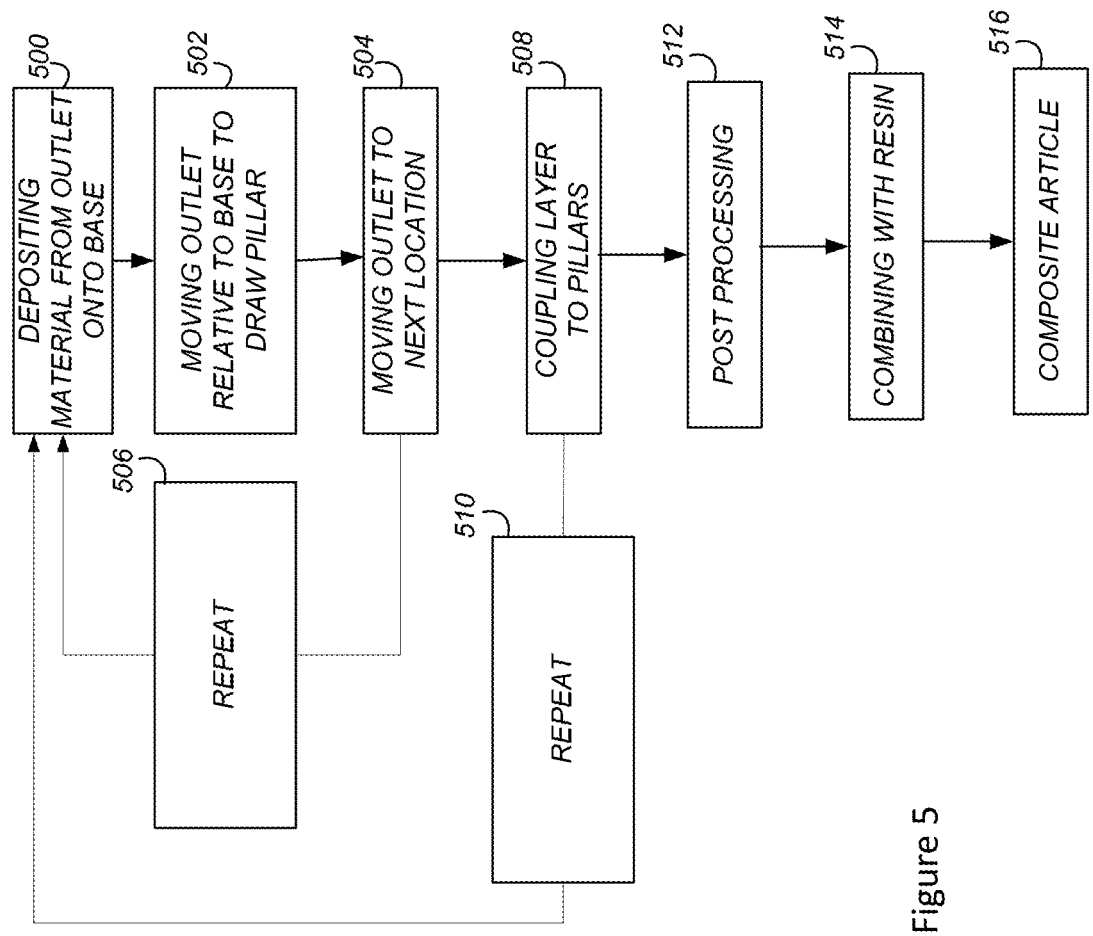
FIG. 5 is a flowchart illustrating a method of fabricating a composite article according to one or more embodiments.

The 3D printer can be used to control morphology of the deposited material (314) as illustrated in FIG. 3B, so that key elements of the deposited material (314) include the anchor (316), base (318) and extrusion or upright (320). In one or more examples, the process for combining the network (304) and the plies (312) proceeds as illustrated in FIG. 5.

Figure 7A:
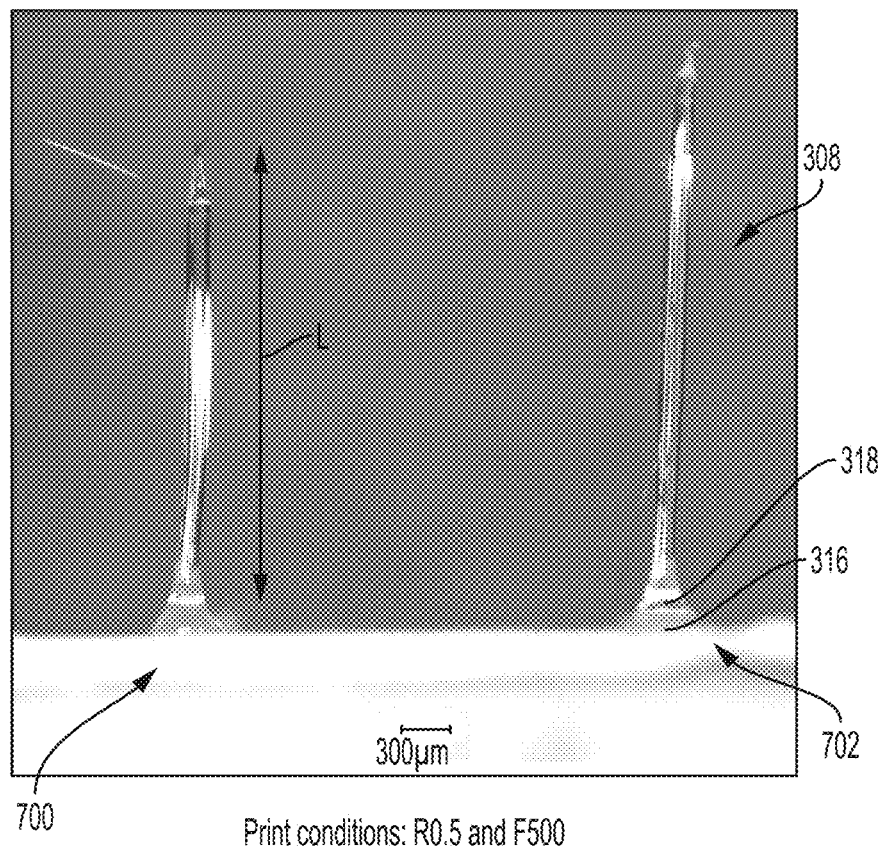
FIG. 7A illustrates pillars drawn from an anchor using print conditions of filament feed rate R=0.5 revolutions per minute and nozzle speed F=500 mm/min have a diameter of 150 micrometers, a length of 2.9 mm, and an areal density of 6 g/m$^2$.
Figure 7B:
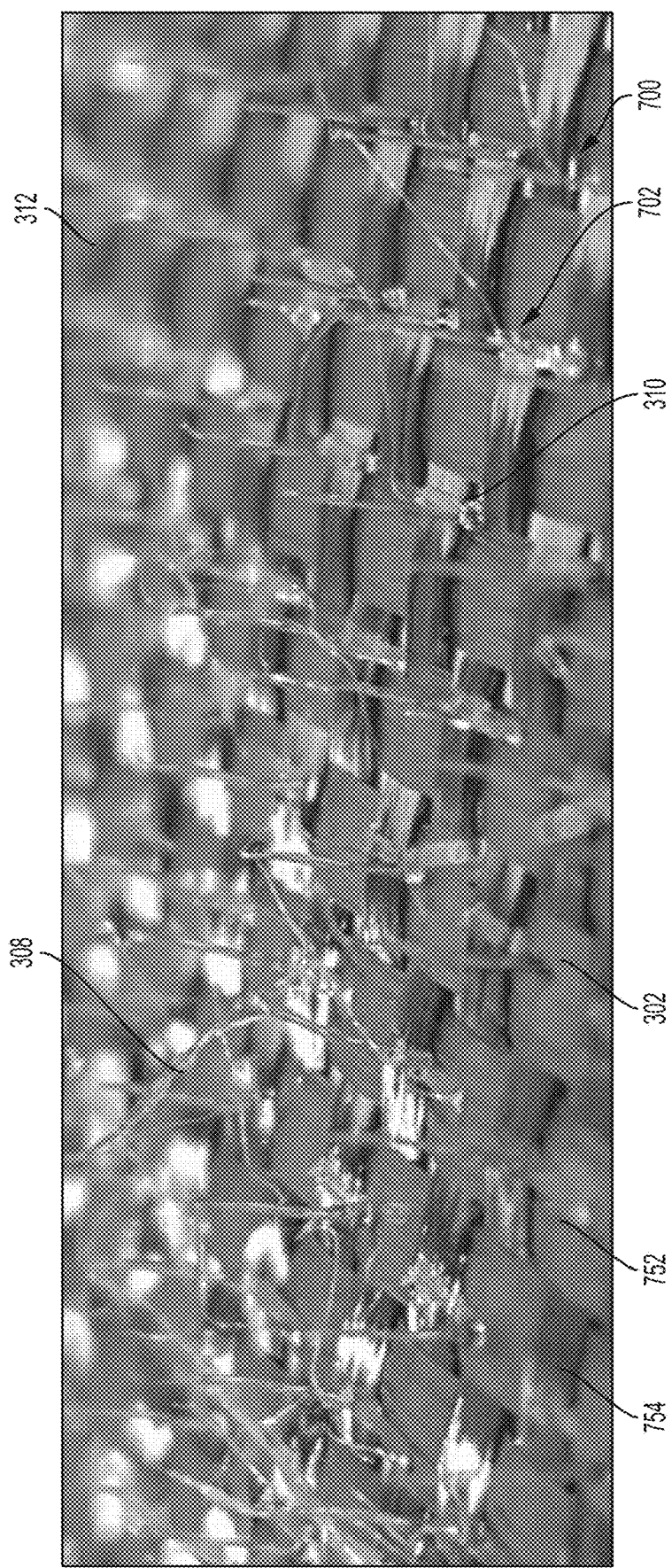
FIG. 7B illustrates pillars printed on a porous plain weave fiber mat so that when carbon fiber mats are stacked together, at least a portion of the pillars pass through the spaces or pores between the tows.

Block 500 represents depositing material (314) from an outlet (450) onto a base layer (408) while moving the outlet and the base layer (408) relative to one another, first in an x-y plane (412) and then in a z-direction (414), so as to form an anchor (316) on the ply (312) at a first location (700) (see FIGS. 7A and 7B).

In one example, the step comprises:

(1) Depositing material from a nozzle (402) onto the base layer (408) while the nozzle (402) moves first in an x-y plane (412) for a first predetermined distance (e.g., 3 mm), so as to form the anchor (316) on the base layer (408). In one or more examples, the anchor (316) is defined as a substrate, foundation, and/or source for the pillar (308) providing the material (314) for the pillar (308) and/or providing something for the pillar (308) or wall (308c) to stick to once the pillar (308) is formed.

(2) The nozzle (402) printing in the z-direction (414) on the anchor (316) for a second predetermined distance (e.g., 0.5 mm). The nozzle (402) only prints in the z-direction (414) for a short distance to prevent or suppress the pillars (308) or walls (308c) from slumping and forming a thick base (318).

Block 502 represents moving the outlet and the base layer (408) relative to one another with or without feed of the material (314) from the outlet (450), so that a portion of the anchor (316) is drawn to create a pillar (308) or wall (308c). In one example, after step (2) above, step (3) comprises the nozzle (402) pulling or moving up in a z-direction (414) a third predetermined distance (e.g., 5 mm) with feed of material or with the feed rate turned off (no feed of the material (314) from the nozzle (402)) and using the stringiness from the material (314) in the anchor (316) to create the uprights (320) forming the pillars (308) in the z-direction. FIG. 7A illustrates how a portion of the anchor (316) is pulled upwards to create the pillar (308).

Block 504 represents moving the outlet (450) and the base layer (408) relative to one another so that the outlet (450) is positioned above a next location 702 on the base layer (408).

In one or more examples, the step comprises releasing the pillar (308) or wall (308c) from the outlet (450) (e.g., nozzle (402)) prior to moving the outlet (450). For example, after step (3) above, the following steps are performed:

(4) With the feed rate of the material (314) from the nozzle (402) on or still turned off and the nozzle (402) at the third predetermined distance (e.g., 10 mm) above the base layer (408) or print bed, the nozzle (402) moves to a fourth predetermined distance (e.g., 3 mm) above a next location (702) on the base layer (408); and (5) The nozzle (402) head drops down, with the feed rate of the material (314) from the printer (400) on or still turned off.

Block 506 represents repeating steps in Blocks 500-504 (or steps (1)-(5)) so as to create a plurality of the pillars (308) or walls (308c) on the base layer (408).

Figure 6:
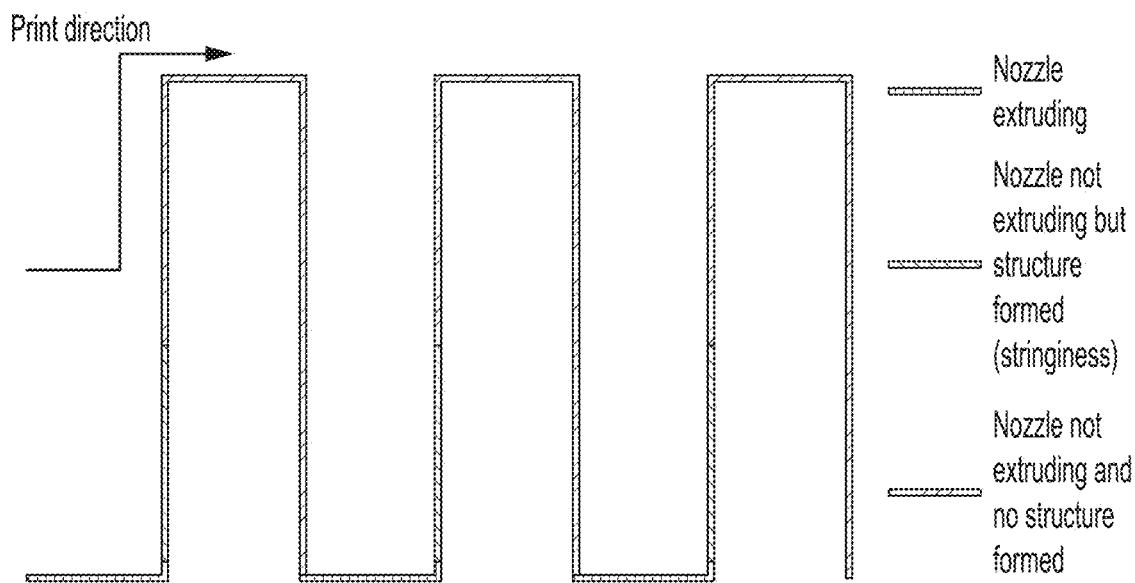
FIG. 6 illustrates an exemplary trajectory for the print head during deposition of a cellular network, according to one or more embodiments.

FIG. 6 illustrates an exemplary trajectory for the print head for deposition of the pillars, according to one or more embodiments, showing periods when the nozzle is extruding as the nozzle moves in the x-y plane, periods when the nozzle is not extruding but a structure (e.g., pillar 308) is formed by moving the print head in a z-direction, and periods where the nozzle is not extruding and no structure is formed (e.g., between pillars 308). In one or more examples, material (314) is also fed, deposited, or expelled from the nozzle during periods when the nozzle is pulling or extruding to form the pillar (308).

In one or more examples, the base layer (408) is a ply (312) comprising a plurality of the fiber tows (302) and a portion of each of the anchors (316) is drawn between the fiber tows (302) to create the plurality of the pillars (308) passing through a different space (310) between the fiber tows (302), as illustrated in FIG. 7B. FIG. 7B further illustrates an example where the ply (312) comprises a mat (750). The mat (750) comprises orthogonal (e.g., carbon) fiber tows (752, 754) that are woven together. The boundaries (756) of the fiber tows (752, 754) define the spaces (310). The base (318) and anchor (316) of each pillar (308) is anchored or attached to the boundaries (756) of the fiber tows (752, 754) so that the pillars (308) can pass through the spaces (310).

Figures 7C, 7D:
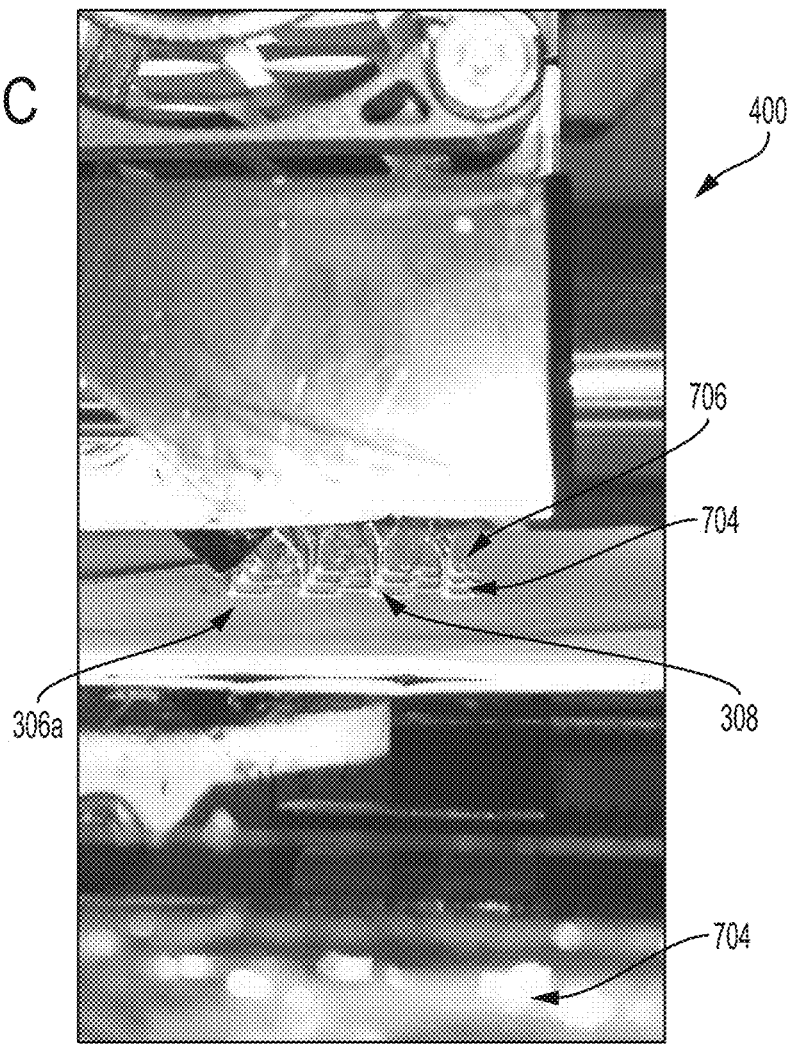
FIG. 7C illustrates deposition of the cellular network including pillars and FIG. 7D is a close up view of the cellular network in FIG. 7C.

FIG. 7C illustrates another example wherein the base layer (408) is a mat (706) comprising the material (314) or a layer (306a) of the material (314) comprising a cellular network (704). The pillars (308) are then drawn from the mat. In this case, or in other cases where the pillars are pre-formed on a base layer (408) different from a ply (312), the ply (312) is then positioned after the formation of the pillars (308) so that the pillars pass through the spaces (310) between the fiber tows (302).

In one or more further examples, each of the plurality of the pillars (308) or walls (308c) are bonded to at least one of the fiber tows (302) as the portion of each of the anchors is drawn between the fiber tows (302).

In one or more examples, during the step of Block 506, material (314) from the anchor (316) is drawn to the next location (702) (i.e., drawn from one pillar (308) to the next pillar (308) being formed), or material (314) is deposited between the pillars (308) so that the material (314) forms a plurality of pillars (308) on the base layer (408) and a layer (306a) connecting the pillars (308).

Block 508 represents optionally coupling a layer (306a) to the pillars (308) or walls (308c) (if the layer (306a) has not been previously formed) so that the pillars (308) or walls (308c) pass between the fiber tows (302) before connecting with the layer (306a). The step may comprise depositing material (314) from the nozzle onto the pillars (308) or walls (308c) so as to form the layer (306a) connected to the tops of the pillars (308) or walls (308c) that extend above the fiber tows (302). In various examples, the layer (306) comprises a network or web comprising filaments. In other examples, the step comprises positioning the layer (306) formed by a different (e.g. non-printed) method.

Block 510 represents optionally repeating the steps of Blocks 500-508 to form a composite article (300) comprising a plurality of layers (306a, 306b) or walls (306c, 308b) and plies (312). For example, after a layer (306a) of material (314) is deposited or placed on a top side of a ply (336d) using the 3D printer (400) so as to connect with the pillars (308) or walls (308c) (Block 508), a subsequent ply (336c) is deposited thereon and the process of Blocks 500-508 is repeated so as to form a stack (360) (referring to the example illustrated in FIG. 3C). Thus, the steps of Blocks 500-508 can be repeated using the layer (306a) (e.g., a mat of the material (314)) as the base layer (408) in the next step of Block 500.

While the base layer may comprises a mat of the material (314) or ply (312) comprising fiber tows (302) deposited using three dimensional printing, in other embodiments, the fiber tows (302) and the layer (306a) and/or mat of the material (314) are fabricated using one or more methods different from the three dimensional printing.

In some embodiments, pillars (308) or walls (308c) that do not pass through the spaces (e.g., pores) are squashed by the stacked plies (312).

Block 512 represents optional post processing steps. The composite article (300) may optionally be heated so that the material (314) bonds to the plies (312) after the pillars (308)/walls (308c) and plies (312) have been formed or deposited. In one or more examples, the material (314) in network (304) (e.g., cellular network (704)) bonds, at various strength levels, to the fibers in the fiber tows (302), subject to the surface tension of the deposited material (314) and melt temperature of the material (314). Other postprocessing techniques may be used to heat and bond the fibers in the fiber tows (302) and the cellular network (704) together in 3 dimensions, using vacuum forming or a roller, as shown FIGS. 8A-8D and 9, respectively.

Block 514 represents optionally combining the plies (312) and network (304) with resin (380). The resin (380) may fill gaps between the reinforcement layer (e.g., ply 312) and the cellular network (704). The resin may bond the cellular network (704) and the plies (312) to form a consolidated article.

Block 516 represents the end result, a composite article (300) comprising the pillars (308) or walls (308c), the layer(s) (306a, 306b), and the one or more plies (312).

The composite article may be embodied in many ways. Examples, include but are not limited to, one or any combination of the following examples.

1. The composite article (300, 300b, 300c) including a plurality of fiber tows (302) and a network (304) of material (314) combined with the fiber tows (302). The network (304) comprises layers (306a, 306b) connected by pillars (308), wherein each of a plurality of the pillars (308) are drawn from one of the layers (306a) and pass through a different space (310) between the fiber tows (302) so as to connect the one of the layers (306a) to another of the layers (306b). The network (304) forms a physical barrier reducing propagation of cracks in the composite article (300).

2. The composite article (300, 300b) including a plurality of plies (312), wherein the plurality of plies (312) each include a plurality of the fiber tows (302) and a plurality of the different spaces (310), wherein at least one of the plies (312) is between two of the layers (306a, (306b) connected by the pillars (308), and the plurality of the pillars (308) drawn from the one of the layers (306a) pass through the different spaces (310) in the at least one ply (312) between the two of the layers (306a, 306b).

3. The composite article (300b) wherein the fiber tows (340a, 340b, 340c, 340d) are disposed in a plurality of plies (336a, 336b, 336c, 336d) or layers (338a, 338b, 338c, 338d), the spaces (342) are through a plurality of the layers (338a, 338b, 338c, 338d) or plies (336a, 336b, 336c, 336d), and the spaces (342) are bounded by fiber tows (340a, 340b, 340c, 340d) in different layers (338a, 338b, 338c, 338d) or plies (336a, 336b, 336c, 336d). The different orientations (370) of the fiber tows (340a, 340b, 340c, 340d) create the spaces (310) between the fiber tows (340a, 340b, 340c, 340d).

4. The composite article (300, 300b. 300c) wherein the pillars (308) and/or the layers (306a, 306b) comprise material (314) used for additive manufacturing.

5. The composite article (300, 300b, 300c) wherein the layers (306a, 306b) and/or the pillars comprise a thermoplastic or a hybrid of the thermoplastic.

6. The composite article (300, 300b, 300c) wherein the pillars (308) and/or the layers comprise a thermoplastic comprising polyamide, polyetherketone (PEK), polyetheretherketone (PEEK), polyetherketoneketone (PEKK), polyimide (PI), or polyetherimide (PEI)

7. The composite article (300, 300b, 300c) wherein the fiber tows (302) comprise at least one material (314) chosen from fiberglass, kevlar, thermoplastic, and carbon.

8. The composite article (300, 300b, 300c) wherein the pillars (308) and/or the layers comprise a hybrid of a thermoplastic including at least one additive or inclusion selected from a surfactant, a stabilizer, a powder, a fiber, and a particulate.

9. The composite article (300, 300b, 300c) wherein the fiber tows (302) each have a diameter D of at least 2 mm and include at least 1000 fibers (referring to FIGS. 3, 7A, 9).

10. The composite article (300, 300b, 300c), wherein the plies (312) each have a thickness T3 in a range of 2-10 mm (referring to FIGS. 3, 7A, 9).

11. The composite article (300, 300b, 300c) wherein the pillars (308) and the layers (306a, 306b) each independently have a thickness T2 in a range of 2-5 mm (referring to FIGS. 3, 7A, 9).

12. The composite article (300, 300b, 300c) wherein the pillars (308) each have a L length in a range of 1-3 mm (referring to FIGS. 3, 7A, 9).

13. The composite article (300, 300b, 300c) having a total thickness T in a range of 1.0 mm-50 mm (referring to FIGS. 3, 7A, 9).

14. The composite article (300, 300b, 300c) wherein the plies (312) comprising the fiber tows (302) arranged into a braided fabric, a woven fabric, a non-crimp fabric, or unidirectional tape.

15. The composite article (300b) wherein the fiber tows (340a, 340b, 340c, 340d) are arranged in braids including yarns and the pillars (308) pass through spaces (310) between the yarns or between the fiber tows (340a, 340b, 340c, 340d).

16. The composite article (300, 300a, 300b) wherein the fiber tows (302) are arranged in braids including yarns and the pillars (308) pass through spaces (310) between the yarns or between the fiber tows (302), and the yarns pass through spaces in between the spaces (310) in the ply (312).

17. The composite article (300, 300a, 300b) wherein the spaces (310) between the fiber tows (302) are in an intermediate layer between the fiber tows (302) and are made of thermoplastic.

18. The composite article (300, 300b, 300c) further comprising resin filling gaps between the plies (312) and bonded to pillars (308), the layers (306a, 306b), or the layers (306a, 306b) and the pillars (308).

19. The composite article (300, 300b, 300c) wherein the layers and/or the pillars (308) have a roughened surface that aids mechanical interlocking with resin.

20. The composite article (300, 300b, 300c) wherein the pillars (308) are thicker at a base (318) from which the pillar is drawn from the one of the layers (306a).

21. The composite article (300, 300b, 300c) wherein the pillars (308) are inclined from the one of the layers (306a) to the another of the layers (306b).

22. The composite article (300, 300b, 300c) wherein the extrusions or pillars (308) are distributed uniformly.

23. The composite article (300, 300b, 300c) wherein the extrusions or pillars (308) are distributed on-uniformly, for example as a function of the need for increased pull off strength. In one or more examples, the cellular network (704) is concentrated near a perimeter of the composite for 3 mode improvement.

24. A joint (1002) comprising the composite article (300, 300b, 300c), the joint comprising a skin (1004), a stiffener (1006), and an interfacial region (1008) between the skin (1004) and the stiffener (1006), wherein the interfacial region (1008) comprises a composite article (300, 300b) including fiber tows (302), and a network (304) comprising material (314) drawn between the fiber tows (302) and forming a physical barrier reducing propagation of cracks in the composite article. The interfacial region (1008) comprises a portion of the skin (1004), a portion of the stiffener (1006), and/or a layer between the skin (1004) and the stiffener (1006).

25. In one or more variations, the pillars (308) comprise or are replaced by struts, walls, extrusions, or supports that pass through the plies (e.g., fabric).

b. Pillar Morphology

The morphology of the deposited material (314) can be controlled using the 3D printer (400). In illustrative embodiments described herein, the key elements of the deposited material (314) include the anchor (316), the pillar or extrusion base (318) and the upright (320) or extrusion, as illustrated in FIG. 3B.

TABLE 1

Example extrusion and anchor morphologies as a function of print settings

| Component name | Print Setting | Dimensions range | Description/Comments |
| --- | --- | --- | --- |
| Anchor (316) | Nozzle extruding | Length: >1 mm Width: 0.15-0.6 mm | Typically 3 mm long and 0.43 mm wide for a 0.4 mm nozzle |

TABLE 1-continued

Example extrusion and anchor morphologies as a function of print settings

| Component name | Print Setting | Dimensions range | Description/Comments |
| --- | --- | --- | --- |
| | | | Width and shape vary depending on where on the carbon fibre mat the anchor crosses. |
| Extrusion base (318) | Nozzle extruding for ~0.5 mm and off for the remainder of the process. | Length: 0.3-1.5 mm long (depending on combination of user programming and nozzle diameter and/or speed) | Typically 0.8 mm long Coned area with base to tip ratio ~3.5 |
| Extrusion or upright (320) | Nozzle head not extruding | Length: 2.5-5 mm (dependent on average diameter of 0.002-0.03 mm. | Typically 2.5 mm long with average diameter of 0.01 mm for a 0.4 mm nozzle Coning ratio with bottom to top of extrusion ~1.25 |

Note: The dimensions ranges are greatly determined by the nozzle (402) diameter, print settings and the user input (software/programming language). In any of the examples described herein, the pillars (308) may be defined as comprising the upright (320) or extrusion only (not including the base (318)). In other examples, the pillars (308) are defined as comprising the extrusion base (318) and the upright (320) on the extrusion base (318). The height H and average diameter Daverage may refer to the combined height of the base (318) and upright (320) or the height of the upright (320), for example.

In one or more examples, the layers (306a, 306b) and/or the pillars (308) have a roughened or irregular surface that aids mechanical interlocking with the resin.

In one or more examples, the pillars (308) are thicker at a base (318) from which the pillar (308) is drawn.

c. Preforming and Post Processing Techniques

FIGS. 8A-8D illustrate a method of forming a composite article using vacuum forming and resin infusion.

Figure 8A:
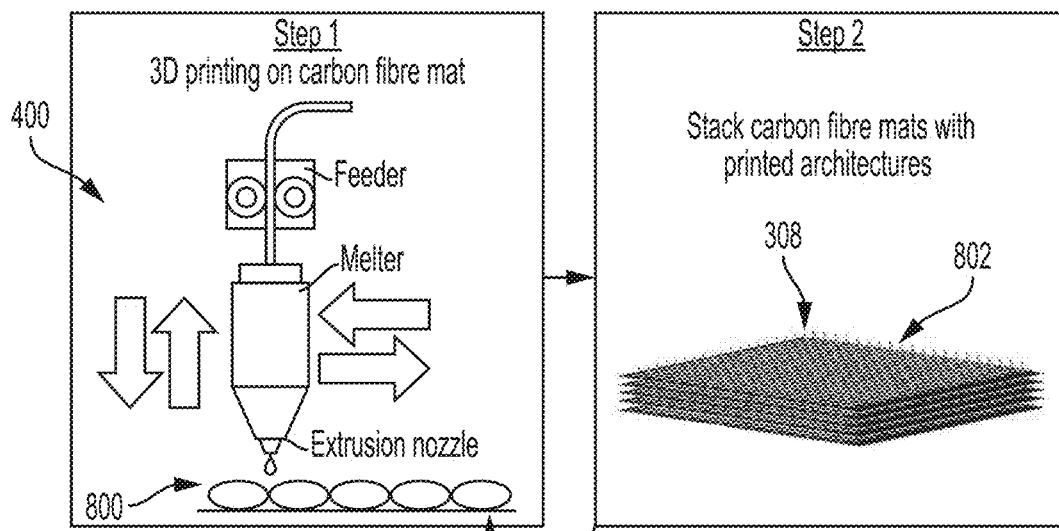
FIGS. 8A-8D illustrates a process flow for fabricating a composite article including vacuum forming.

FIG. 8A illustrates a first step of 3D printing on/through each of a plurality of plies (312) comprising mats (800) to form one or more mats (800) with printed architectures (e.g., comprising pillars (308) as described herein). In one or more examples, the mats (800) comprise carbon fiber mats. Although FIG. 8A is described for the case where the plies include mats (800), method illustrated in FIGS. 8A-8D can also be implemented using any ply (including any of the example plies described herein).

Figure 8B:
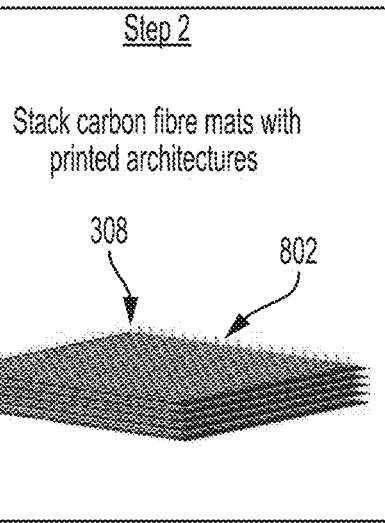

FIG. 8B illustrates a second step of stacking the mats (800) with the printed architectures, thereby forming a stack (802) of the mats (800). The mats (800) comprising a plurality of fiber tows (302) are placed so that each of a plurality of the pillars (308) pass through a space between the fiber tows (302). In one or more examples, the extrusions or pillars (308) that go through the pores or spaces (310) can then link with the material (314) that is printed on the overlying printed mat (800).

Figure 8C:
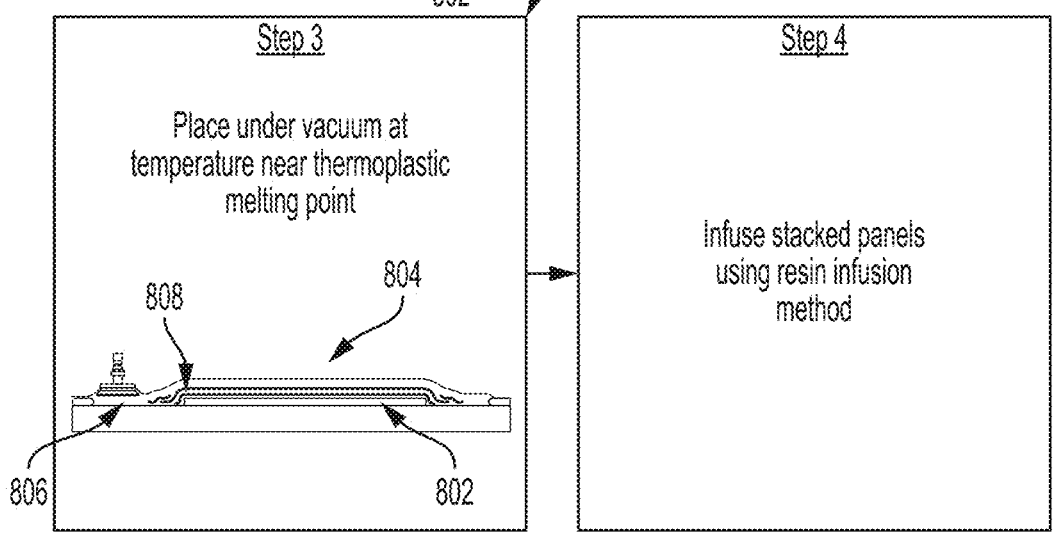

FIG. 8C illustrates a third step of vacuum forming, comprising placing the stack (802) under vacuum (804) at a temperature near the material's melting point (in the example where the material (314) is a thermoplastic, at the temperature near the thermoplastic melting point), for example 170° C. for nylon 12. In one or more examples, the stack (802) of mats (800) are preformed by placing the mats (800) in an enclosure (806) and a vacuum bag (808) under the vacuum (804) at a temperature just above the melting temperature of the material (314). In one or more examples, the vacuum forming also enables more linking between the mats (800) and the network (304) (e.g., cellular network 704).

Figure 8D:
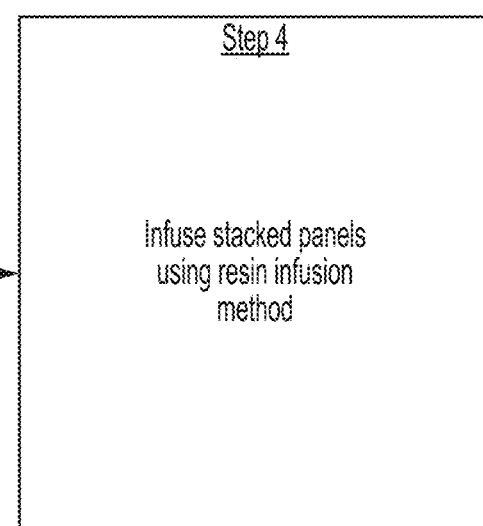

FIG. 8D illustrates infusing the stacked and vacuum formed mats (800) using a resin infusion method. In one or more examples, the mats (800) are infused by resin in a liquid molding process. The resin fills gaps between the mats (800) and is bonded to pillars (308) and/or the layers (306*a*, 306*b*).

Figure 9:
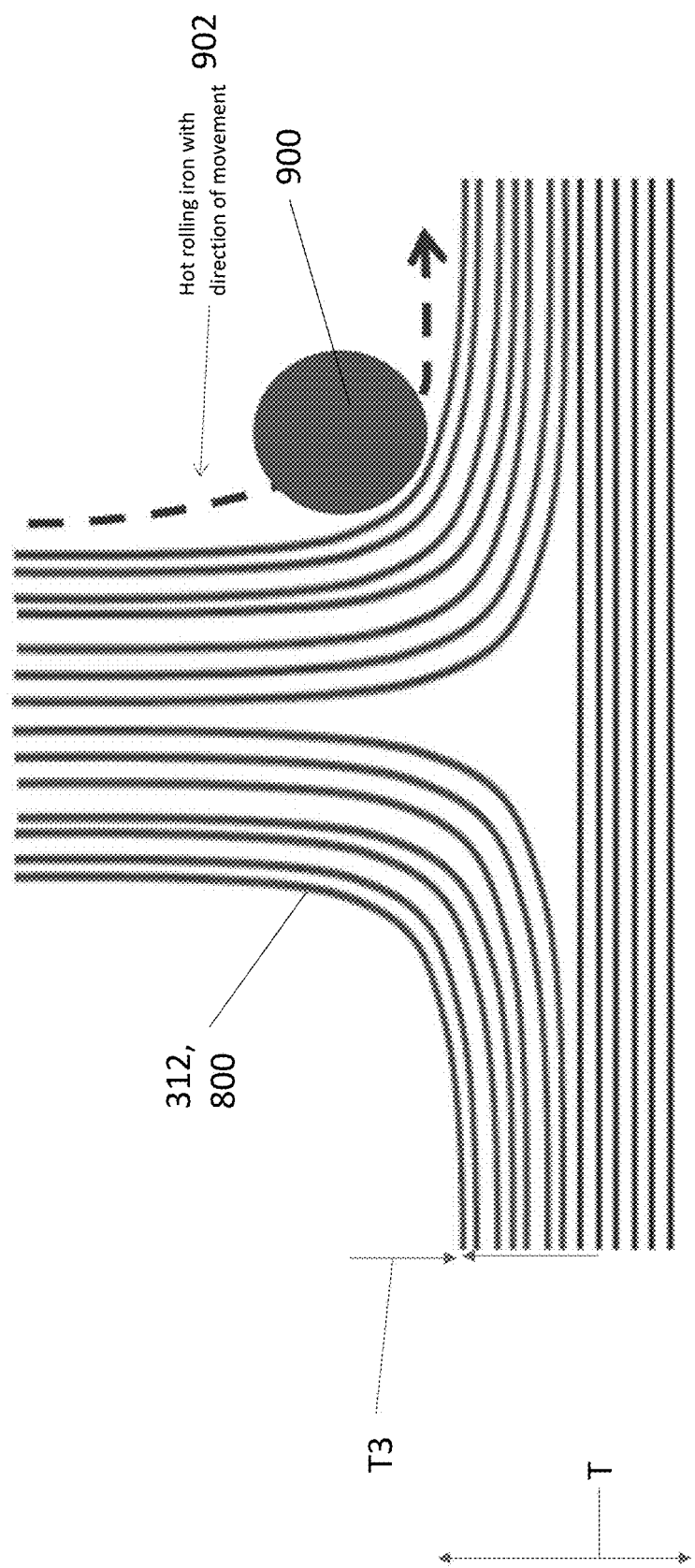
FIG. 9 illustrates using a hot rolling iron to apply pressure and heat that encourages movement of the thermoplastic in the cellular network through the fiber layers.

FIG. 9 illustrates an alternative to vacuum bag preforming, comprising using a hot rolling iron 900 to apply pressure and heat to the stacked plies (312) or mats (800) along the direction (902) shown, so as to encourage the material (314) (e.g., thermoplastic) to go through the fiber layers (i.e., between the fiber tows 302) in the plies (312). The iron (900) could be used at the end of a single layup of a ply (312) or after the layup of a given amount of plies (312).

Example Applications

In one or more embodiments, the cellular networks described herein are used to toughen composites used on aircraft, particularly at high stress concentration regions where mode I or mode II loads are experienced, e.g., in an Integrated Aircraft Structure (IAS). Integrated Aircraft Structures are currently being joined by fasteners that provide a source of redundancy to encourage predictable failure in an otherwise brittle epoxy due to the poor fracture toughness properties of composites. However, the primary problem with using fasteners is the increased weight they induce as parts are often made thicker than necessary to account for the high stress concentrations from the fastener holes. Additionally, composite failure due to bolts and fasteners initiates locally at the hole but then tends to propagate in the through-thickness direction. By increasing the fracture toughness and providing a means for a more predictable failure, IAS can be joined more effectively using composite articles described herein. More specifically, embodiments of the present invention improve mode I and mode II fracture toughness to provide a way for stable composite failure needs to be employed so as to either reduce the fasteners used for connecting composite parts, or to minimize the safety factor that is applied to part thickness when being mechanically joined.

Figure 10:
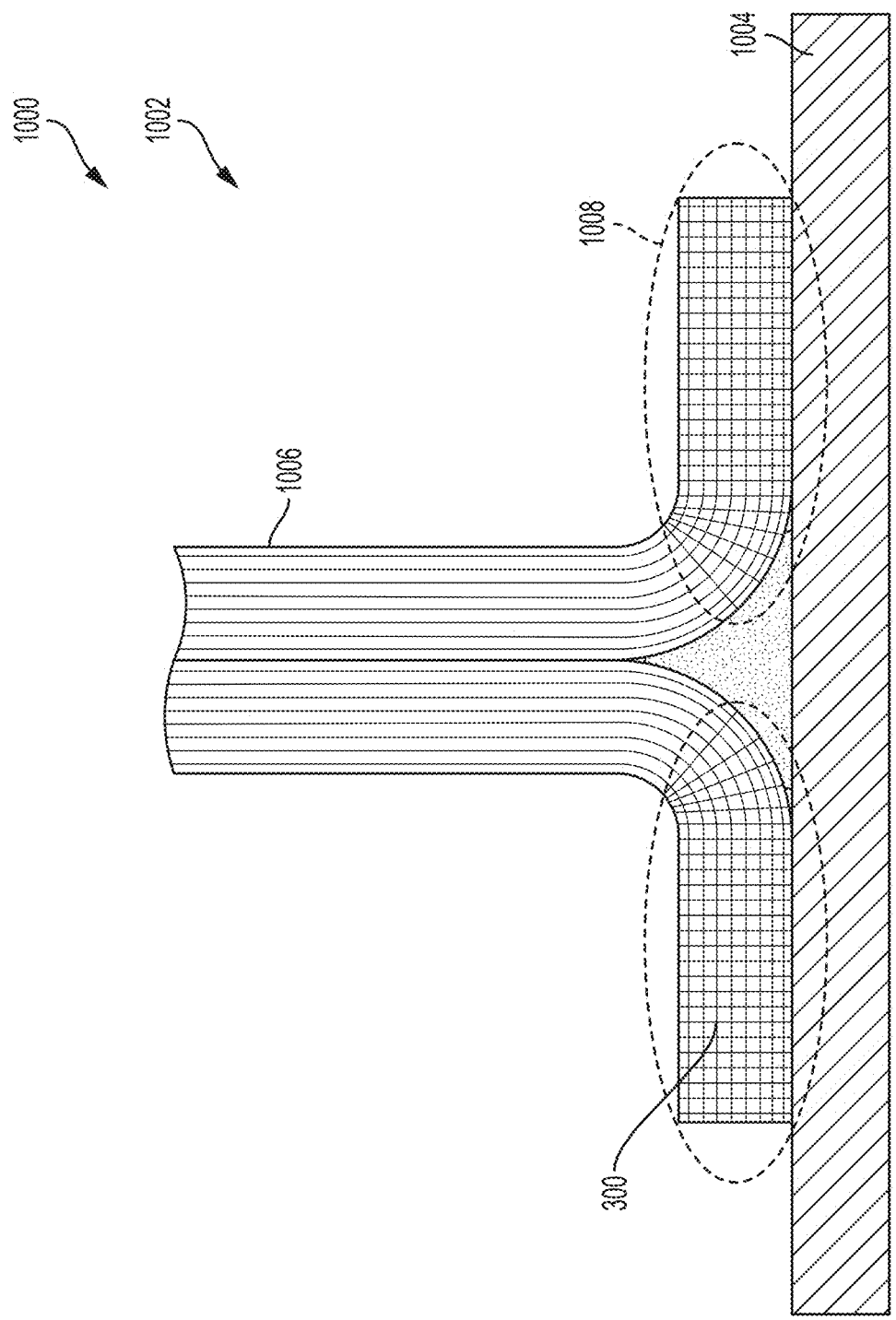
FIG. 10 illustrates an example T-joint incorporating a composite article as described herein.

FIG. 10 illustrates an integrated aircraft structure 1000 (a T-joint 1002) comprising a skin 1004, a stiffener 1006, and an interfacial region 1008 between the skin (1004) and the stiffener 1006. The interfacial region (1008) comprises a composite article (300) as described herein including fiber tows (302) and a network (304) comprising material (314) drawn between the fiber tows (302) and forming a physical barrier reducing propagation of cracks in the composite article (300). The interfacial region (1008) may comprise a portion of the skin (1004), a portion of the stiffener (1006), and/or a layer between the skin (1004) and the stiffener (1006).

The composite articles (300) according to embodiments of the present invention are not limited to use in integrated aircraft structures. The composite articles described herein may be used in any applications that require improvement in the damage tolerance of composites.

Advantages and Improvements

The present disclosure describes a continuous through thickness method that can provide the surprising and unexpected combination of improved fracture toughness and damage tolerance, without degradation of the in-plane properties, as well as significant weight savings when used in aircraft applications (consequently lowering the cost of air travel).

There is currently no known composite toughening technique or structure similar to the composite articles and techniques described herein. The thermoplastic network combined with the plies according to embodiments illustrated herein is different from conventional veils because it is 3D throughout the thickness of the composite. Moreover, exemplary thermoplastic networks also differ from conventional through thickness techniques as microstructural defects to the fibers in the fiber tows are eliminated or comparatively suppressed. In addition, conventional through thickness techniques to do not enable thermoplastic to link around the carbon tows so as to form a cellular network. However, illustrative composite articles described herein have the general characteristics of a veil with the added feature that a first veil like structure is now connected through the pores of the woven fabric to another veil.

Processing Environment

Figure 11:
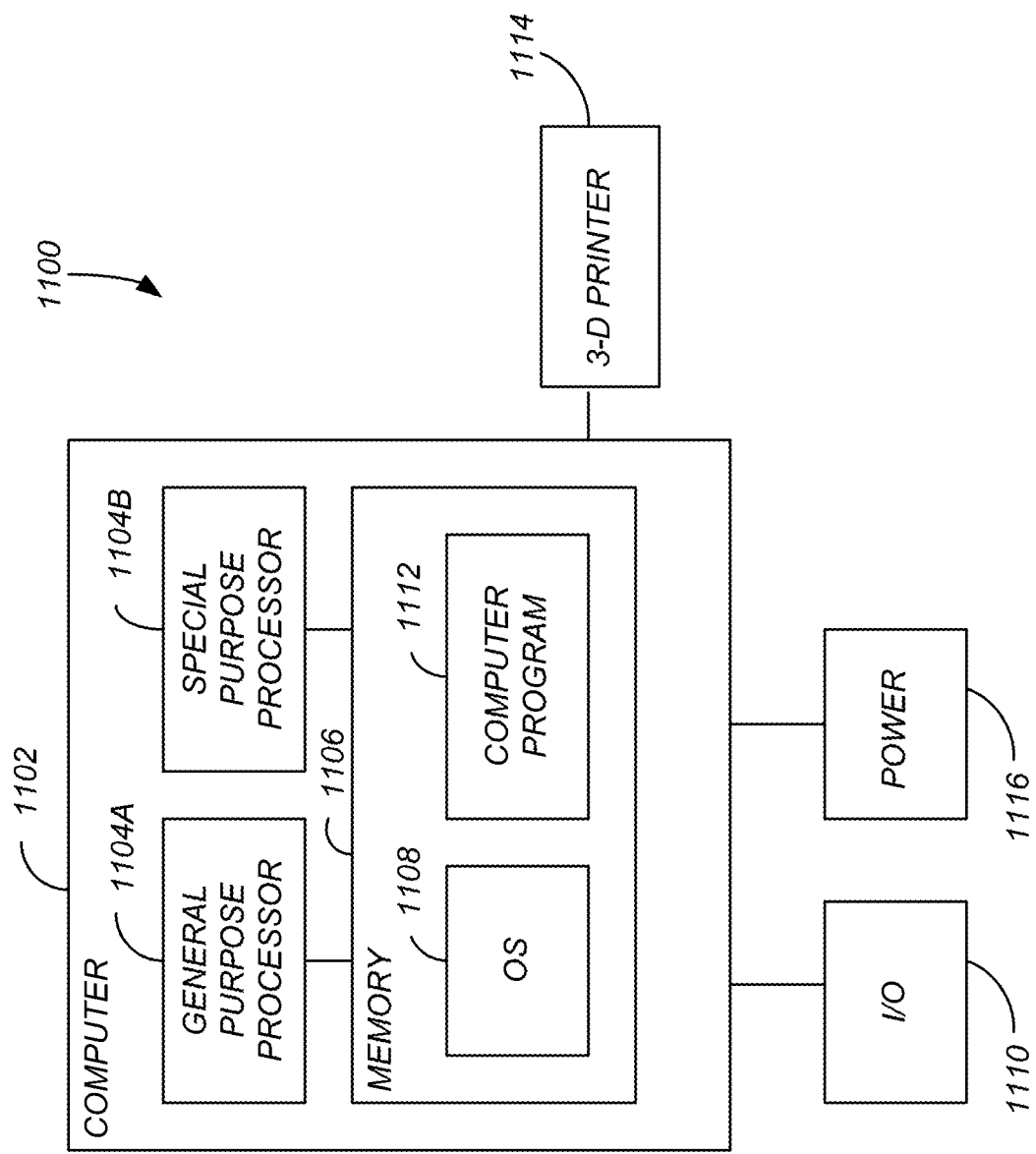
FIG. 11 illustrates a processing environment for controlling a 3D printer according to embodiments described herein.

FIG. 11 illustrates an exemplary system 1100 used to implement processing elements needed to control the 3D printers (400) described herein.

The computer 1102 comprises a processor 1104 (general purpose processor 1104A and special purpose processor 1104B) and a memory, such as random access memory (RAM) 1106. Generally, the computer 1102 operates under control of an operating system 1108 stored in the memory 1106, and interfaces with the user/other computers to accept inputs and commands (e.g., analog or digital signals) and to present results through an input/output (I/O) module 1110. The computer program application 1112 accesses and manipulates data stored in the memory 1106 of the computer 1102. The operating system 1108 and the computer program 1112 are comprised of instructions which, when read and executed by the computer 1102, cause the computer 1102 to perform the operations herein described. In one embodiment, instructions implementing the operating system 1108 and the computer program 1112 are tangibly embodied in the memory 1106, thereby making one or more computer program products or articles of manufacture capable of performing the printing methods described herein (e.g., as described in FIG. 5). As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present disclosure. For example, those skilled in the art will recognize that any combination of the above components, or any number of different components, peripherals, and other devices, may be used.

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. A composite article, comprising:
a first layer;
a second layer;
a plurality of fiber tows between the first layer and the second layer; and
a plurality of pillars connected to the first layer, each of the pillars passing between at least two of the fiber tows so as to connect the first layer to the second layer.

2. The composite article of claim 1, wherein the first layer, the second layer, and the pillars form a network comprising a physical barrier reducing propagation of a plurality of cracks in the composite article.

3. The composite article of claim 1, wherein the plurality of pillars each comprise a material drawn from the first layer.

4. The composite article of claim 1, wherein the fiber tows are arranged into a braided fabric, a woven fabric, a non-crimp fabric, or a unidirectional tape.

5. The composite article of claim 1, wherein at least one of the first layer, the second layer, or the pillars comprise a printable material.

6. The composite article of claim 1, wherein:
the first layer and the second layer each have a thickness in a range of 2-5 mm, and
the pillars each comprise a portion drawn between the first layer and the second layer, the portion having a length in a range of 1-3 mm.

7. The composite article of claim 1, further comprising a resin bonded to at least one of the first layer, the second layer, or the pillars.

8. A joint including the composite article of claim 1.

9. An integrated aircraft structure comprising the composite article of claim 1, wherein the integrated aircraft structure comprises:
a skin;
a stiffener; and
an interfacial region comprising the composite article, the interfacial region comprising at least one of a first portion of the skin, a second portion of the stiffener, or a layer between the skin and the stiffener.

10. An aircraft including the composite article of claim 1.

11. The composite article of claim 1, wherein:
the fiber tows are arranged in plies, and
the composite article further comprises a resin filling gaps between the plies.

12. The composite article of claim 11, wherein the plies comprise the fiber tows arranged into a braided fabric, a woven fabric, a non-crimp fabric, or a unidirectional tape.

13. A composite article, comprising:
a plurality of fiber tows:
a network comprising a material drawn between the plurality of fiber tows and forming a physical barrier reducing propagation of a plurality of cracks in the composite article, wherein:
the network further comprises a first layer and a second layer:
the material connects the first layer to the second layer;
at least some of the plurality of fiber tows are between the first layer and the second layer:
at least one of the first layer, the second layer, or the material comprise a thermoplastic or a hybrid of the thermoplastic; and
the thermoplastic comprises at least one polymer chosen from a polyamide, a polyetherimide, a polyetherketone, a polyetheretherketone, a polyetherketoneketone, polyimide, and a polyphenylsulphone.

14. The composite article of claim 13, wherein the hybrid of the thermoplastic includes at least one additive or inclusion selected from a surfactant, a stabilizer, a powder, a fiber, and a particulate.

15. A method of making a composite article, comprising:
depositing a first layer;
depositing a plurality of fiber tows; and
drawing a plurality of pillars between the fiber tows, each of the pillars passing between at least two of the fiber tows; and
depositing a second layer so that the plurality of pillars connect the first layer to the second layer.

16. The method of claim 15, wherein the first layer, the second layer, and the pillars comprise a printable material.

17. The method of claim 15, wherein at least one of the first layer, the second layer, or the material are deposited using three dimensional printing.

18. The method of claim 15, wherein:
at least one of the first layer, the second layer, or the pillars comprise a thermoplastic or a hybrid of the thermoplastic, and
the thermoplastic comprises at least one polymer chosen from a polyamide, a polyetherimide, a polyetherketone, a polyetheretherketone, a polyetherketoneketone, polyimide, and a polyphenylsulphone.

19. The method of claim 15, further comprising disposing the composite article in an integrated aircraft structure comprising a skin attached to a stiffener.

20. The method of claim 15, wherein:
the first layer and the second layer each have a thickness in a range of 2-5 mm; and
the pillars each comprise a portion drawn between the first layer and the second layer, the portion having a length in a range of 1-3 mm.

* * * * *